(12) United States Patent
Beaton et al.

(10) Patent No.: US 11,049,048 B2
(45) Date of Patent: Jun. 29, 2021

(54) MANAGING REUSABLE BUSINESS PROCESS MODELING (BPM) ASSETS

(75) Inventors: Murray J. Beaton, Ontario (CA); Christina P. Lau, Ontario (CA); Scott P. Peddle, Ontario (CA)

(73) Assignee: International Business Machines Corporation, Armonk, NY (US)

(*) Notice: Subject to any disclaimer, the term of this patent is extended or adjusted under 35 U.S.C. 154(b) by 2911 days.

(21) Appl. No.: 12/266,448

(22) Filed: Nov. 6, 2008

(65) Prior Publication Data

US 2010/0114631 A1    May 6, 2010

(51) Int. Cl.
*G06Q 10/06*    (2012.01)
(52) U.S. Cl.
CPC ........... *G06Q 10/06* (2013.01); *G06Q 10/063* (2013.01)
(58) Field of Classification Search
USPC ........................................................ 705/348
See application file for complete search history.

(56) References Cited

U.S. PATENT DOCUMENTS

| | | | | |
|---|---|---|---|---|
| 2002/0147611 A1* | 10/2002 | Greene | .......... | G06Q 10/063112 705/1.1 |
| 2003/0046282 A1* | 3/2003 | Carlson | .................... | G06F 8/36 |
| 2007/0033567 A1 | 2/2007 | Carlson | | |
| 2007/0162324 A1 | 7/2007 | Suzuki | | |
| 2007/0288412 A1* | 12/2007 | Linehan | ................. | G06Q 10/06 706/45 |

OTHER PUBLICATIONS

Markovic et al., "Towards a Formal Framework for Reuse in Business Process Modeling", BPM 2007 Workshops, LNCS 4928, 2008, pp. 484-495.
Shishkov et al., "Aligning Business Process Modeling and Software Specification in a Component-Based Way", ICEIS 2004 - Information Systems Analysis and Specification, pp. 103-108.

* cited by examiner

*Primary Examiner* — Andrew B Whitaker
(74) *Attorney, Agent, or Firm* — Christopher M. Pignato

(57) ABSTRACT

A method for managing reusable BPM assets can be provided. The method can include selecting a process in a process model in a process modeling tool, retrieving a list of BPM assets in a repository of reusable BPM assets dependent upon the selected process and selecting individual ones of the BPM assets for importation into the process modeling tool in association with the selected process. Finally, the method can include importing into the process modeling tool the selected individual ones of the BPM assets from the repository of reusable BPM assets over a computer communications network.

12 Claims, 3 Drawing Sheets

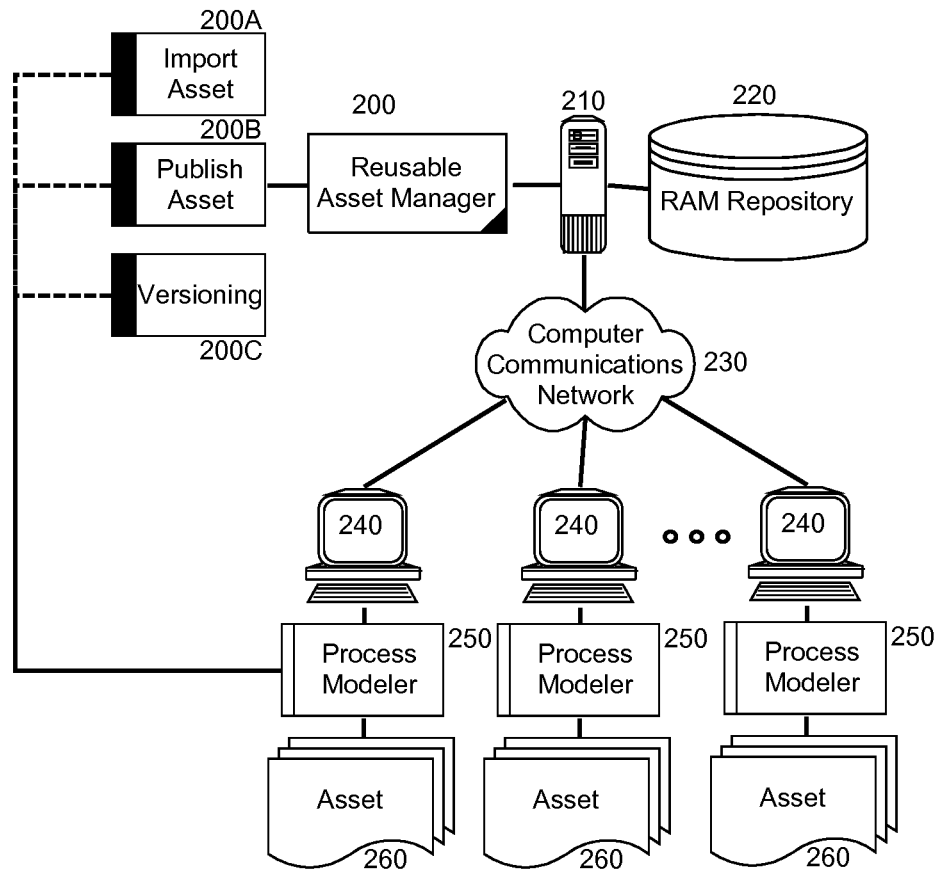
FIG. 2
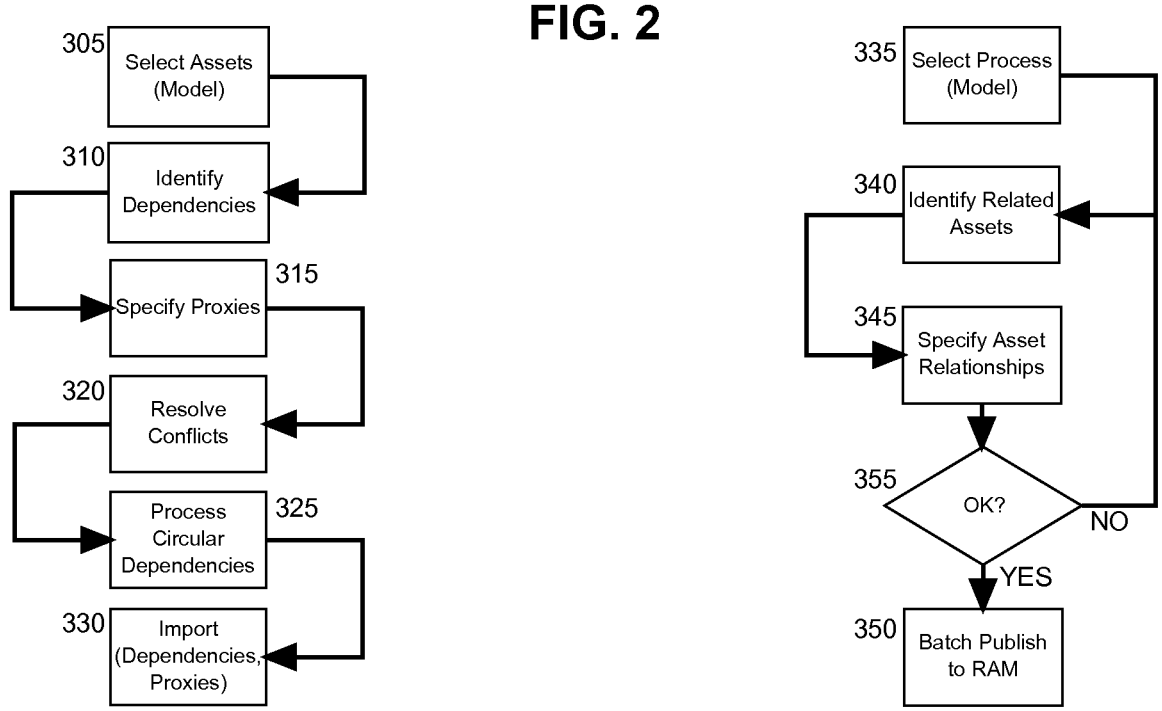
FIG. 3A
FIG. 3B

MANAGING REUSABLE BUSINESS PROCESS MODELING (BPM) ASSETS

BACKGROUND OF THE INVENTION

Field of the Invention

The present invention relates to the field of modeling more particularly to managing process model assets.

Description of the Related Art

Process modeling and simulation relates to the modeling and simulation of dynamic or static systems, which can include, but are not limited to, enterprise management systems, engineering systems, networked information technology systems, utility systems, utility computing systems, autonomic computing systems, on-demand systems, electric power grids, biological systems, medical systems, weather systems, financial market systems, and business process systems. Such systems can be modeled and simulated for a variety of purposes including monitoring, analysis, control, design, simulation, and management.

A process model is an abstract description of a process such as a business process or any other process related to the lifecycle of a system. The abstract description of the process model can include sufficient detail required by a simulation engine for exercising the process model with one or more scenarios to determine a likely outcome. Process models generally specify one or more tasks or activities of a process and the relationship between the different tasks or activities. As part of the model, one or more events or conditions leading to the transition from one task or activity to the next can be specified. Models generally are expressed according to a specific format. Exemplary formats include Activity Decision Flow (ADF) Unified Modeling Language (UML) activity diagrams, and the Business Process Execution Language (BPEL), to name only a few.

In a business process model (BPM), the tasks, activities, actors, elements and the relationship there between can be individually grouped as BPM assets. In that the BPM assets can be grouped individually, BPM assets can be reused in different combinations with other BPM assets as part of different BPM solutions. Consequently, development tools have been configured to manage BPM assets in a development environment much as the traditional integrated development environment (IDE) manages the creation and use of source code modules in producing a conventional computer program.

Managing reusable BPM assets in a development tool such as a BPM modeling and/or simulation tool is not without its challenges. For one, it can be critical to manage linkages between different reusable BPM assets as some BPM assets will be dependent upon other BPM assets, and changes in one BPM asset may impart changes in other linked BPM assets. Asset modeling tools marketed today, however, are not suitable for managing reusable BPM assets because contemporary tools have been described as being too fine grain and lacking functionality to create meaningful asset boundaries. By way of example, a business process might include a set of related use cases and services that must be managed as a whole.

Some advanced modeling tools have been expressly created to govern and manage assets. Such advanced modeling tools provide a facility to download, submit, review, rate, and discuss BPM assets in a collaborative environment. Yet, such advanced modeling tools do not recognize BPM assets and BPM assets relationships that are critical for large-scale deployment of BPM solutions. For example, such advanced modeling tools lack the ability to recognize versions of processes and services, and the ability to search for processes, the linkage between development, test and production environment for a particular process or service.

BRIEF SUMMARY OF THE INVENTION

Embodiments of the present invention address deficiencies of the art in respect to the use of BPM assets in a development environment and provide a novel and non-obvious method, system and computer program product for managing reusable BPM assets. In an embodiment of the invention, a collaborative BPM modeling data processing system can be configured for managing reusable BPM assets. The system can include a reusable asset manager executing in a server and configured to manage a repository of reusable BPM assets and different process modeling tools, each communicatively coupled to the reusable asset manager over a computer communications network.

The system also can include a publish asset module coupled to both the reusable asset manager and the process modeling tools. The publish asset module can include program code enabled to identify related BPM assets for a selected BPM process in one of the process modeling tools, to specify relationships between the related BPM assets and to upload each of the selected BPM process, the related BPM assets and the specified relationships into the repository of reusable BPM assets. Conversely, the system can include an import asset module coupled to both the reusable asset manager and the process modeling tools. The import asset module can include program code enabled to identify required BPM assets in the repository of reusable BPM assets for a selected BPM asset, and to import selected ones of the selected BPM asset and the required BPM assets into one of the process modeling tools.

In another embodiment of the invention, a method for managing reusable BPM assets can be provided. The method can include selecting a BPM asset in a process model, retrieving a list of BPM assets in a repository of reusable BPM assets required by the selected BPM asset and selecting individual ones of the selected and required BPM assets for importation into the process modeling tool. Finally, the method can include importing into the process modeling tool the selected individual ones of the selected and required BPM assets from the repository over a computer communications network.

In one aspect of the embodiment, retrieving a list of BPM assets in a repository of reusable BPM assets required by the selected BPM asset further can include grouping the selected and required BPM assets in the list according to recommended BPM assets for importation and optional BPM assets. In another aspect of the embodiment, importing into the process modeling tool the selected individual ones of the selected and required BPM assets from the repository over a computer communications network can include detecting a conflict between a BPM asset selected for importation and an existing BPM asset in the process modeling tool, and generating a prompt in the process modeling tool to resolve the conflict.

In yet another aspect of the embodiment, importing into the process modeling tool the selected individual ones of the selected and required BPM assets from the repository over a computer communications network can include handling circular dependencies apparent amongst the BPM assets by importing each of the BPM assets only once at first appearance. In even yet another aspect of the embodiment, importing into the process modeling tool the selected individual ones of the selected and required BPM assets from the repository over a computer communications network, comprises replacing at least one of the BPM assets with a proxy during importation.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 2 is a schematic illustration of a collaborative BPM modeling data processing system configured for managing reusable BPM assets;

FIG. 3A is a flow chart illustrating a process for importing reusable BPM assets into a collaborative BPM modeling tool from a reusable asset manager repository; and, FIG. 3B is a flow chart illustrating a process for publishing reusable BPM assets from a collaborative BPM modeling tool to a reusable asset manager repository.

DETAILED DESCRIPTION OF THE INVENTION

Embodiments of the present invention provide a method, system and computer program product for managing reusable BPM assets. In accordance with an embodiment of the present invention, different reusable assets can be selected for publication into a collaborative BPM asset manager and the relationship between the different reusable assets can be defined within the collaborative BPM asset manager. Versioning can be provided for each reusable asset to ensure the maintenance of the relationships between correct versions of the different reusable assets and to avoid conflicts. Subsequently, the importation of different reusable assets can trigger the importation of required BPM assets defined by way of the defined relationships between the different reusable assets, though a proxy for a given reusable asset can take the place of the actual reusable asset for the purpose of simplifying the transfer and storage of content while maintaining the requisite relationships amongst the reusable assets. Finally, conflicts amongst different versions of a reusable asset during importation can be detected to avoid unwarranted collisions resulting from different users importing different instances of a reusable asset.

The process described herein can be embodied within a collaborative BPM modeling tool. In illustration, FIGS. 1A through 1D, taken together, are a pictorial illustration of a user interface (UI) for a collaborative BPM modeling tool configured for managing reusable BPM assets. At the outset, a profile can be created for the domain objects of a BPM solution—namely the different BPM asset types, relationships, constraints and review processes that together reflect a BPM solution. Thereafter, the domain objects of the BPM solution can be transformed into assets and corresponding relationships there between.

Figure 1A:
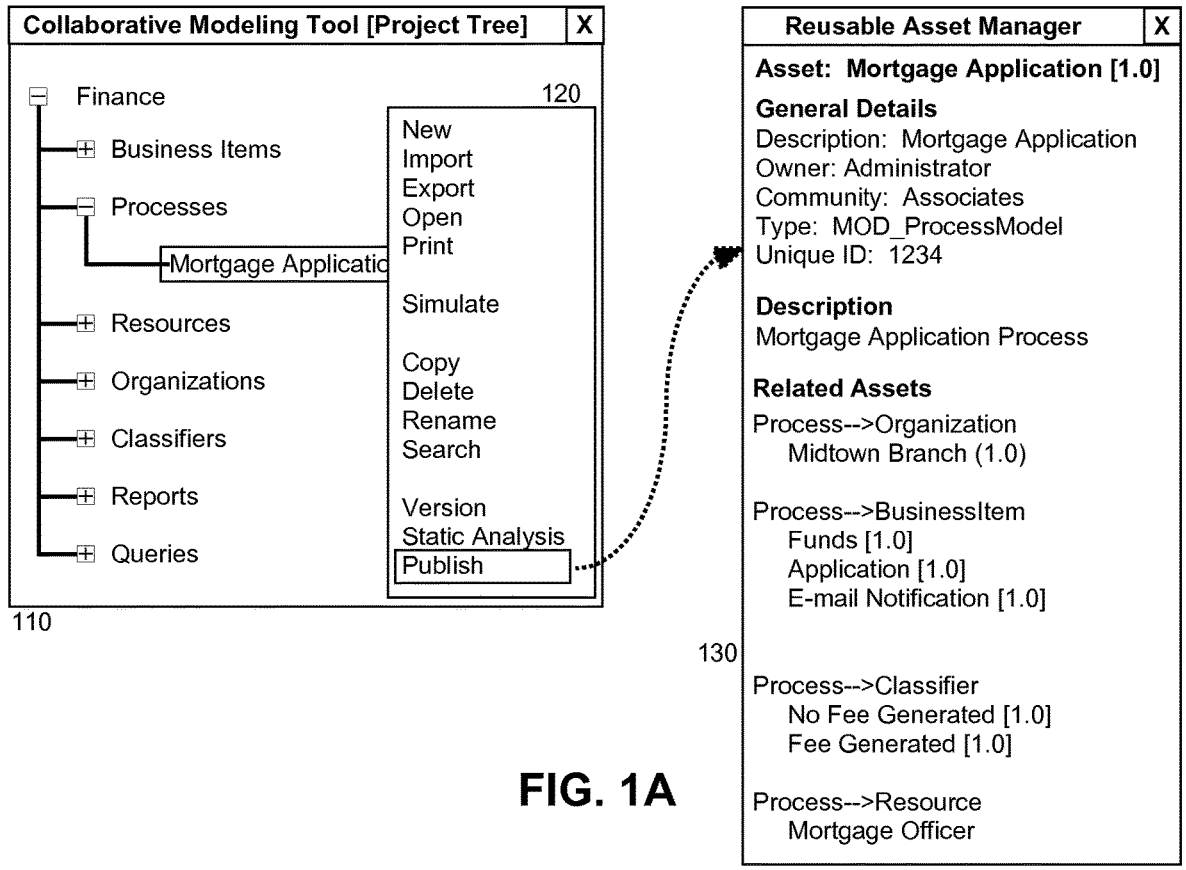
FIGS. 1A through 1D, taken together, are a pictorial illustration of a user interface (UI) for a collaborative BPM modeling tool configured for managing reusable BPM assets.

As shown in FIG. 1A, a modeling tool user interface 110 can provide a hierarchical view of a BPM solution including one or more business processes relating one or more artifacts or assets. A pop-up window 120 can be activated for a selected business process through which an election to publish the assets of the business process to a reusable asset manager repository can be provided. Upon electing the publication of the assets of the selected business process, the assets of the selected business process can be specified and the relationships there between further can be specified. As a result, a reusable asset manager user interface 130 can display the published assets of the business process including versioning information for each of the published assets.

Figure 1B:
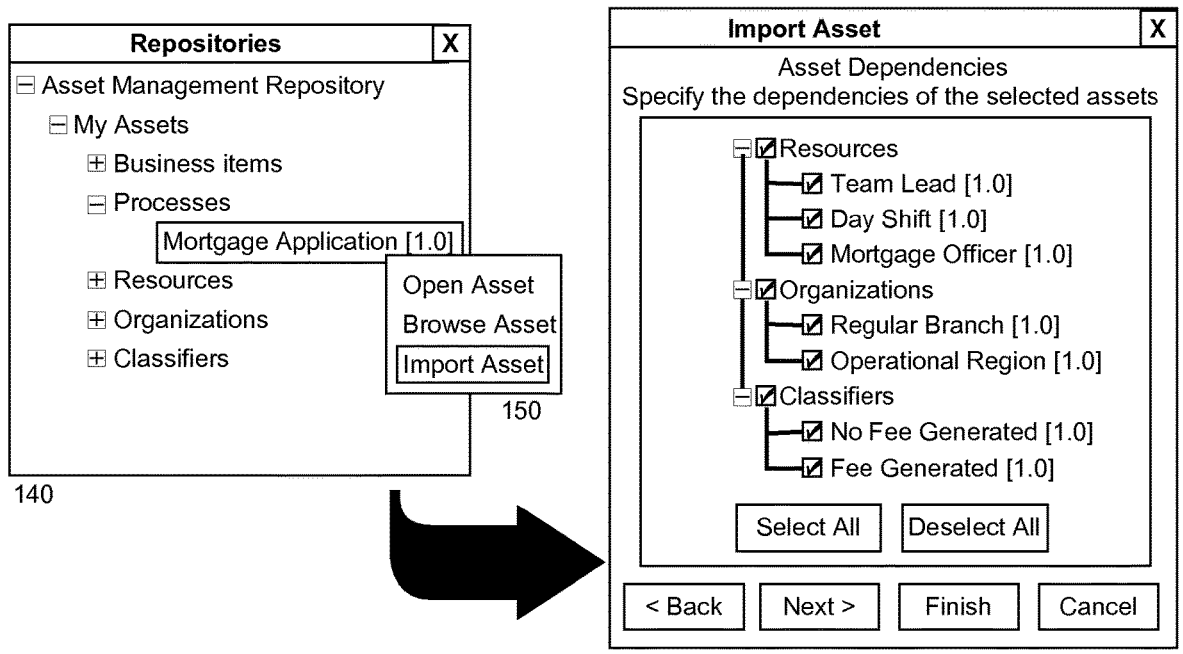

Turning now to FIG. 1B, published assets in the reusable asset manager repository can be selected for importation into the business process modeling tool. Specifically, a repository user interface 140 can be provided to display a hierarchical view of the reusable assets stored in the repository. A business process defined therein can be selected and a pop-up window 150 for the selected business process can be activated. The pop-up window 150 can provide an opportunity to elect the importation of a selected asset of the business process in the reusable asset manager repository into the business process modeling tool. In response to the election of importing the selected asset, an asset import user interface 160 can be rendered through which required assets for the selected asset can be listed for selection and subsequent importation into the business process modeling tool.

Figure 1C:
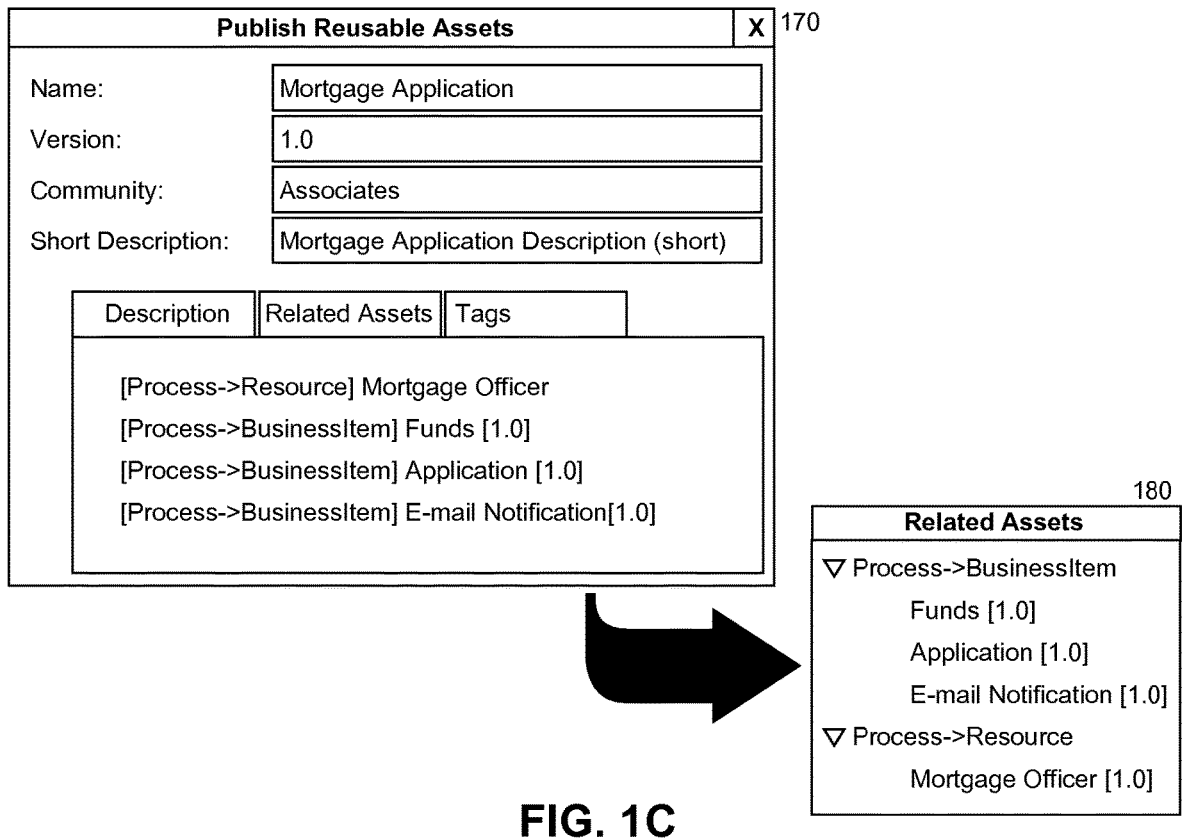
Figure 1D:
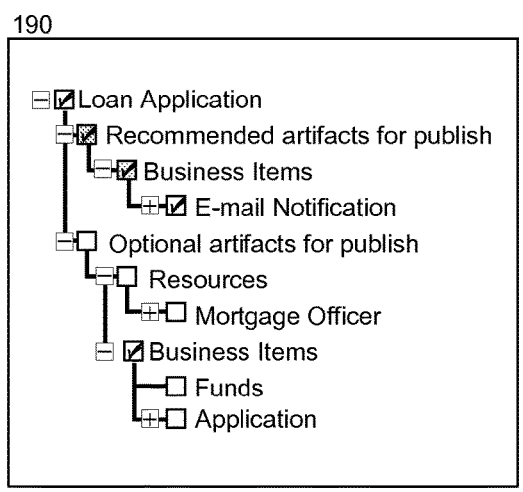

Turning now to FIG. 1C, during the publication of a business process from business modeling tool to reusable asset manager repository, the related assets of the business process can be displayed along with versioning data for each of the related assets in a publication user interface 170. Correspondingly, once published the related assets can be displayed from the reusable asset manager repository in a related assets user interface 180 so as to express the relatedness of the different assets of the business process. As in the case of the publication user interface 170, versioning data can be provided for each of the related assets in the related assets user interface 180.

Of note, when publishing a business process from business modeling tool to reusable asset manager repository, dependency assets of an object selected for publish can be divided into two groupings: Recommended and Optional. Recommended artifacts are assets that if excluded from publication may jeopardize model integrity and include assets that either do not exist in the reusable asset manager repository, or assets that have changed since last publication. Remaining assets are considered Optional artifacts. The recommended asset user interface 190 of FIG. 1D demonstrates an exemplary mode of presenting recommended and optional artifacts during the publication process.

The process described in connection with the pictorial illustrations of FIG. 1 can be implemented within a collaborative BPM modeling data processing system. In further illustration, FIG. 2 schematically depicts a collaborative BPM modeling data processing system configured for managing reusable BPM assets. The system can include different client computing hosts 240 each supporting the operation of a process modeling tool 250. Each process modeling tool 250 in turn can manage the definition and arrangement of assets in a BPM solution.

A server 210 further can be provided to host a reusable asset manager 200. The reusable asset manager 200 can be coupled to a reusable asset manager repository 220 by way of the server 210 and can be configured to accept publication of selected ones of the assets 260 into the repository 220 from different ones of the process modeling tool 250 over computer communications network 230, and also to support the importation of selected ones of the assets 260 from the repository 220 into different ones of the process modeling tool 250.

Notably, the reusable asset manager 200 can be coupled to each of an import asset module 200A, a publish asset module 200B and a versioning module 200C. In this regard, one or more of the import asset module 200A, the publish asset module 200B and the versioning module 200C can be included as part of the reusable asset manager 200, the individual ones of the process modeling tool 250, or both. The import asset module 200A can include program code enabled to selectively import assets 260 and their dependencies according to a selection thereof through any one process modeling tool 250.

Because asset relationships will have been defined and detected during the initial publication of the assets 260 into the repository 220, all subsequent imports of those assets 260 can be inclusive if desired. By inclusive, it implies that just a selected one of the assets 260 can be imported, or a selected one of the assets 260 and others of the assets 260 upon which the selected one of the assets 260 depend. Consequently, end users need not manually populate and manage workspaces with required artifacts. Model integrity also can be ensured as part of the import process.

Of note, the program code of the import asset module 200A can be enabled to resolve circular references amongst the dependencies by tracking the navigation of each asset during importation and prohibiting the re-importation of an asset already encountered during importation. Additionally, conflict resolution when importing an asset already present in a process modeling tool 250 can be supported through a prompting of the end user according to a comparison of a unique identifier for the asset to be imported in combination with a name of the asset to be imported and, optionally, the content of the asset to be imported, with a unique identifier for the existing asset in combination with a name of the existing asset and, optionally, the content of the existing asset.

Optionally, assets 260 can also be partially imported by leveraging proxies. The use of a proxy for a dependency of an imported one of the assets 260 can allow model integrity to be maintained without requiring the importation of the content of every dependency so as to clutter the development environment of the process modeling tool 250. Further, in using a proxy for a dependency of an imported one of the assets 260, changes to the BPM solution in the process modeling tool 250 can be confined to a small portion of the BPM solution. Within the process modeling tool 250, distinguishing a proxy object from a complete object is achieved by referencing a proxy for an object as "<Object name> . . . ", while an object fully imported can be referenced as <Object Name> within the import asset user interface of the process modeling tool 250.

The publish asset module 200B can include program code enabled to selectively publish assets 260 and identified dependencies from a process modeling tool 250 to the reusable asset manager repository 220. Publication of the assets 260 to the repository 220 can occur in batch rather than real-time in order to first verify the integrity of the model in respect to the selected ones of the assets 260 for importation and the defined relationships there between. Thereafter, the selected assets 260 can be uploaded in order to optimize performance of the process of communicating the selected assets 260 over the computer communications network 230.

Finally, versioning module 200C can include program code enabled to apply a string value to an imported one of the assets 260 as a version. Version numbers can be generated based upon existing versions of published ones of the assets 260. The initial version number for a newly published one of the assets 260 can be assigned "1.0". Thereafter, new versions of a published one of the assets 260 require the removal of punctuation from the version string, the subsequent conversion of the string to an integer, the incrementing of the integer, the conversion of the integer into a string, and the insertion of a "." between each character of the string.

In even yet further illustration of the operation of the collaborative BPM modeling data processing system, FIG. 3A is a flow chart illustrating a process for importing reusable BPM assets into a collaborative BPM modeling tool from a reusable asset manager repository. Beginning in block 305, an asset for a process model can be selected for importation from the reusable asset manager repository. In block 310, the dependencies of the selected asset can be identified and, to the extent desired, one or more proxies can be specified for corresponding ones of the identified dependencies. In block 320, conflicts between existing assets in the process modeling tool and the identified dependencies can be resolved, as can circular dependencies in block 325. Finally, in block 330 the dependencies and proxies where appropriate can be imported into the process modeling tool.

Turning now to FIG. 3B, a flow chart is shown illustrating a process for publishing reusable BPM assets from a collaborative BPM modeling tool to a reusable asset manager repository. Beginning in block 335, a process for a process model can be selected for publication to the reusable asset manager repository. In block 340, assets related to the selected process model can be identified and in block 345, the relationships between the different related assets can be specified. In decision block 355, if the relationships have been satisfactorily identified and specified, in block 350 the process, identified assets and specified relationships can be published in batch to the reusable asset manager repository.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A method comprising:

electing, from a user interface of a process modeling tool, to publish BPM assets to a repository of reusable BPM assets, with each BPM asset including a grouping of tasks, a grouping of activities, a grouping of actors, a grouping of elements and relationships the groupings;

publishing elected BPM assets to the repository of reusable BPM assets;

selecting, using the user interface, a BPM asset from the repository of reusable BPM assets for importation into the process modeling tool;

importing, the BPM asset selected from the repository of reusable BPM assets into the process modeling tool where, in response to importing the BPM asset, an asset import user interface is rendered comprising a listing of a plurality interdependent BPM assets that are required when using the BPM asset selected;

importing, from the repository to the process modeling tool, the plurality of interdependent BPM assets displayed by the rendered asset import user interface, wherein the importing of the plurality of interdependent BPM assets into the process modeling tool comprises:

detecting that a first interdependent BPM asset of the plurality of BPM assets is already imported into the process modeling tool by comparing a unique identifier for the first interdependent BPM asset in combination with a name of the first interdependent BPM asset with a unique identifier for an existing asset imported into the process modeling tool in combination with a name of the existing asset, responsive to the detection that a first interdependent BPM asset of the plurality of BPM assets is already imported into the process modeling tool, resolving a conflict, resolving circular references amongst the plurality of interdependent BPM assets by tracking a navigation of each interdependent BPM asset of the plurality of BPM assets, and prohibiting re-importation of one, or more, interdependent BPM assets already encountered during importation of the plurality of interdependent BPM assets;

versioning the interdependent BPM assets imported into the process modeling tool by applying a version number comprising a string value to the plurality of interdependent BPM assets that are generated based upon existing published versions of the interdependent assets; and modeling, by the process modeling tool, a business process using the selected BPM asset, and the set plurality of interdependent BPM assets that are required when using the selected BPM asset, imported into the process modeling tool.

2. The method of claim 1, further comprising:

grouping the reusable BPM assets in a list according to recommended BPM assets for importation and optional BPM assets.

3. The method of claim 1, wherein the importing the BPM asset selected from the repository of reusable BPM assets into the process modeling tool further comprises:

detecting a conflict between the selected BPM asset and an existing BPM asset in the process modeling tool;

generating a prompt in the process modeling tool to resolve the conflict; and displaying the prompt on the user interface.

4. The method of claim 1, wherein importing, the BPM asset selected from the repository of reusable BPM assets into the process modeling tool further comprises:

replacing at least one of the BPM assets with a proxy during importation, wherein a name of the at least one of the BPM assets replaced with the proxy is distinguishable on the user interface of the process modeling tool from full imported BPM assets.

5. A computer program product comprising a non-transitory computer usable storage medium storing computer usable program code for managing reusable business process model (BPM) assets, the computer program product comprising computer program instructions which during execution in a computer perform:

electing, from a user interface of a process modeling tool, to publish BPM assets to a repository of reusable BPM assets, with each BPM asset including a grouping of tasks, a grouping of activities, a grouping of actors, a grouping of elements and relationships the groupings;

publishing elected BPM assets to the repository of reusable BPM assets;

selecting, using the user interface, a BPM asset from the repository of reusable BPM assets available for importation into the process modeling tool;

importing, the BPM asset selected from the repository of reusable BPM assets into the process modeling tool, where, in response to importing the BPM asset, an asset import user interface is rendered comprising a listing of a plurality interdependent BPM assets that are required when using the BPM asset selected;

importing, from the repository and to the process modeling tool, the plurality of interdependent BPM assets displayed by the rendered asset import user interface, wherein the importing of the plurality of interdependent BPM assets into the process modeling tool comprises:

detecting that a first interdependent BPM asset of the plurality of BPM assets is already imported into the process modeling tool by comparing a unique identifier for the first interdependent BPM asset in combination with a name of the first interdependent BPM asset with a unique identifier for an existing asset imported into the process modeling tool in combination with a name of the existing asset, responsive to the detection that a first interdependent BPM asset of the plurality of BPM assets is already imported into the process modeling tool, resolving a conflict, resolving circular references amongst the plurality of interdependent BPM assets by tracking a navigation of each interdependent BPM asset of the plurality of BPM assets, and prohibiting re-importation of one, or more, of the plurality of interdependent BPM assets already encountered during copying of the plurality of interdependent BPM assets;

versioning the plurality of interdependent BPM assets imported into the process modeling tool by applying a version number comprising a string value to the plurality of interdependent BPM assets that are generated based upon existing published versions of the interdependent assets; and modeling, by the process modeling tool, a business process using the selected BPM asset, and the plurality of interdependent BPM asset s that are required when using the selected BPM asset, imported into the process modeling tool.

6. The computer program product of claim 5, further comprising:
grouping the reusable BPM assets in a list according to recommended BPM assets for importation and optional BPM assets.

7. The computer program product of claim 5, wherein importing the BPM asset selected from the repository of reusable BPM assets into the process modeling tool, further comprises:
detecting a conflict between the BPM asset selected and an existing BPM asset in the process modeling tool;
generating a prompt in the process modeling tool to resolve the conflict; and
displaying the prompt on the user interface.

8. The computer program product of claim 5, wherein importing, the BPM asset selected from the repository of reusable BPM assets into the process modeling tool further comprises:
replacing at least one of the BPM assets with a proxy during importation, wherein a name of the at least one of the BPM assets replaced with the proxy is distinguishable on the user interface of the process modeling tool from full imported BPM assets.

9. A system, comprising:
a reusable asset manager executing in a server and configured to manage a repository of reusable BPM assets each BPM asset comprising a grouping of tasks, activities, actors, elements a relationships therebetween;
a plurality of process modeling tools, each communicatively coupled to the reusable asset manager over a computer communications network;
a publish asset module coupled to both the reusable asset manager and the process modeling tools, the publish asset module comprising program code enabled to identify related BPM assets for a selected BPM process in one of the process modeling tools, to specify relationships between the related BPM assets and to upload each of the selected BPM process, the related BPM assets and the specified relationships into the repository of reusable BPM assets; and,
an import asset module coupled to both the reusable asset manager and the process modeling tools, the import asset module comprising program code enabled to perform:
setting up a repository of reusable BPM assets, with each BPM asset including a grouping of tasks, a grouping of activities, a grouping of actors, a grouping of elements and relationships the groupings;

selecting, via a user interface a BPM asset from the repository of reusable BPM assets available for importation into the process modeling tool;

importing, the BPM asset selected from the repository of reusable BPM assets into the process modeling tool, where, in response to importing the BPM asset, an asset import user interface is rendered by the import asset module and said asset import user interface comprises a listing of a plurality interdependent BPM assets that are required when using the BPM asset selected;

importing, from the repository and to the process modeling tool, the plurality of interdependent BPM assets displayed by the rendered asset import user interface, wherein the importing of the plurality of interdependent BPM assets into the process modeling tool comprises:

detecting that a first interdependent BPM asset of the plurality of BPM assets is already imported into the process modeling tool by comparing a unique identifier for the first interdependent BPM asset in combination with a name of the first interdependent BPM asset with a unique identifier for an existing asset imported into the process modeling tool in combination with a name of the existing asset, responsive to the detection that a first interdependent BPM asset of the plurality of BPM assets is already imported into the process modeling tool, resolving a conflict, resolving circular references amongst the plurality of interdependent BPM assets by tracking a navigation of each interdependent BPM asset of the plurality of BPM assets, and prohibiting re-importation of one, or more, of the plurality of interdependent BPM assets already encountered during copying of the plurality of interdependent BPM assets;

versioning the plurality of interdependent BPM assets imported into the process modeling tool by applying a version number comprising a string value to the plurality of interdependent BPM assets that are generated based upon existing published versions of the interdependent assets; and modeling, by the process modeling tool, a business process using: the selected BPM asset, and the set of plurality of interdependent BPM assets that are required when using the selected BPM asset, imported into the process modeling tool.

10. The system of claim 9, further comprising:
grouping the reusable BPM assets in a list according to recommended BPM assets for importation and optional BPM assets.

11. The system of claim 9, wherein importing the BPM asset selected from the repository of reusable BPM assets into the process modeling tool, further comprises:
detecting a conflict between the BPM asset selected and an existing BPM asset in the process modeling tool;
generating a prompt in the process modeling tool to resolve the conflict; and
displaying the prompt on the user interface.

12. The system of claim 9, wherein importing, the BPM asset selected from the repository of reusable BPM assets into the process modeling tool further comprises:
replacing at least one of the BPM assets with a proxy during importation, wherein a name of the at least one of the BPM assets replaced with the proxy is distinguishable on the user interface of the process modeling tool from full imported BPM assets.

* * * * *